Dec. 22, 1953     C. K. McMILLIN     2,663,112
FISH LURE
Filed July 19, 1950

Clifford K. McMillin
INVENTOR.

BY *Clarence A. O'Brien*
*and Harvey B. Jacobson*
Attorneys

Patented Dec. 22, 1953

2,663,112

UNITED STATES PATENT OFFICE 2,663,112

FISH LURE

Clifford K. McMillin, Bellingham, Wash.

Application July 19, 1950, Serial No. 174,757

2 Claims. (Cl. 43—42.09)

This invention relates to fish lures.

An object of this invention is to provide an improved fish lure which includes in its structural make-up a body member which is provided with means to accommodate various fins which are employed to cause the fish lure to assume various travels and undertake various movements when it is used.

Ancillary objects and features of importance will become apparent in following the description of the illustrated forms of the invention.

Figure 1:
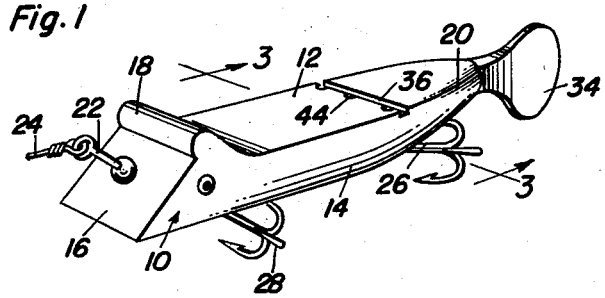
Figure 1 is a perspective view of the device.
Figure 2:
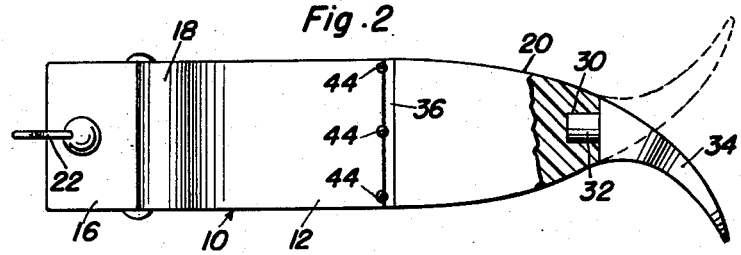
Figure 2 is a plan view of the device shown in Figure 1 with portions broken away in section to illustrate a detail of construction.
Figure 3:
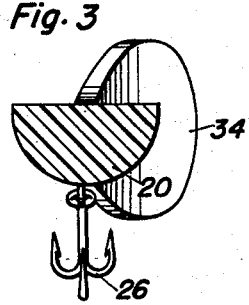
Fig. 3 is a transverse sectional view taken substantially on the line 3—3 of Figure 1 and in the direction of the arrows.
Figure 4:
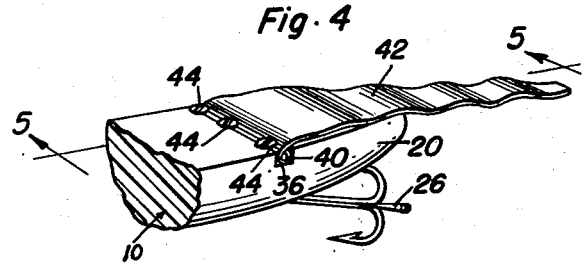
Figure 4 is a fragmentary perspective view showing the use of an additional or a substitute bendable fin for the body.

In carrying out this invention, there is provided a common body 10 which is provided with a substantially flat top or upper surface 12 and a transversely curved bottom surface 14. The front part of the body is provided with a planar panel 16 which slopes rearwardly as it rises until it joins with the smoothly curved bight 18. This bight slopes downwardly and rearwardly until it merges into the flat top surface 12. The rear or back end of the body 10 tapers toward a point as at 20. An eye member 22 is secured to the panel 16 and has a fish line 24 connected thereto for the purpose of drawing the fish lure through the water.

A number of conventional fish hooks 26 and 28 are secured to the bottom of the body 10 to serve their obvious purpose.

An axial bore or opening 30 opens outwardly of the rear or back end of the fish lure body 10 in order to accommodate the pin 32. This pin is secured to the smoothly curved and tapered tail fin 34 whereby the tail fin may be held in place by friction between the bore 30 and the pin 32.

In operation, this form of the invention may be caused to assume various movements in the water by rotating the tail fin 34 a selected amount.

Figure 5:
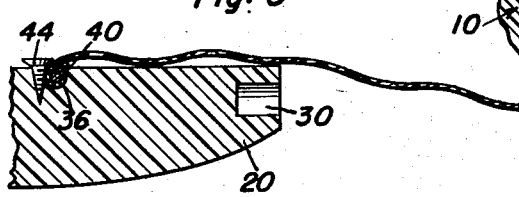
Figure 5 is a central longitudinal sectional view taken substantially on the line 5—5 of Figure 4 and in the direction of the arrows.

A transverse groove 36 of uniform depth opens upwardly and extends across the top 12 of the body 10. The purpose of the groove is to support the sleeve formed by the inner rolled or enlarged end or edge 40 of the bendable or flexible tail fin 42. The bendable or flexible tail fin 42 extends longitudinally and rearwardly of the body 10. Means, as the screws 44, are secured to the body 10 partially overlying the groove 36 to hold the end 40 of the bendable tail fin 42 in place by contact therewith. As noted in Figure 5, the tail fin 42 may be used in the absence of the tail fin 34, or, if it is ever found desirable, both of these may be used simultaneously.

Figure 6:
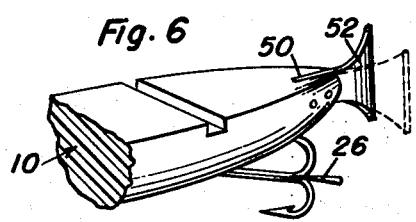
Figure 6 is a fragmentary perspective view of another form of the invention.

Reference is now made to Figure 6, wherein the same body is employed, as is used in the other form of the invention. The differentiating feature is in the specific shape of the opening 50, corresponding to the bore or opening 30. The opening 50 is in the form of a slot to accommodate the inner end of the bendable tail fin 52, which projects rearwardly of the body 10. This tail fin may be bent only horizontally whereas the tail fin 42 may be bent only vertically. Otherwise spoken, the tail fin 52 may be shifted laterally by bending it, while the tail fin 42 may be bent upwardly or downwardly in accordance with the prerogative of the user of the device.

Any material of construction may be employed for manufacture of the lure body as deemed practical. Commercial plastic material is one, whereas wood or any other material may be used as found desirable.

The tail fins are so arranged on the lure body that when the lure is drawn through the water, it may turn the lure over and over again. This motion is similar to the action of a wounded herring as a salmon will go into a school of herring, hitting out with its tail and coming back to pick up the wounded fish.

Also, a part of the purpose of the tail fin of each of the embodiments is to keep the fishing plugs separate at the back of a boat, running one rudder or tail fin to the left and the other to the right so as to keep the fishing lines separate from each other. This prevents a great amount of line tangle, which almost always occurs when a number of individuals are fishing from a moving boat.

Having described the invention, what is claimed as new is:

1. In a fish lure, a body having a front and back end, said body having a substantially flat top, and a straight transverse groove of uniform depth throughout its length in said flat top located intermediate the front and back ends of said body to support a fin, a fin having a front enlarged edge disposed in said groove, and fasteners secured to said body forwardly of and adjacent the groove and having head portions partially overlying said groove and engaging and holding said enlarged edge in said groove.

2. In a fish lure, an elongated lure body having forward and rear ends and a flat top, said flat top having a transverse groove therein disposed intermediate the ends of the body, said groove being straight and of uniform depth throughout its length, a flexible fin having a sleeve at its forward end, said sleeve being fitted in said groove, and screws engaged in the flat top forwardly of and adjacent the groove, said screws including head portions each having a part overlying and engaging the sleeve to retain the same in the groove.

CLIFFORD K. McMILLIN.

References Cited in the file of this patent

UNITED STATES PATENTS

| Number | Name | Date |
|---|---|---|
| 129,665 | Howard | July 23, 1872 |
| 1,264,627 | Foss | Apr. 30, 1918 |
| 1,272,183 | Arnold | July 9, 1918 |
| 1,417,574 | Schmid | May 30, 1922 |
| 1,627,512 | Hughes et al. | May 3, 1927 |
| 1,666,072 | Schilpp | Apr. 17, 1928 |
| 1,683,110 | Bogart | Oct. 16, 1928 |
| 1,723,557 | Ono | Aug. 6, 1929 |
| 1,905,567 | Pflueger | Apr. 25, 1933 |
| 2,216,929 | Zander et al. | Oct. 8, 1940 |
| 2,235,597 | Winter | Mar. 18, 1941 |
| 2,290,512 | Weesner | July 21, 1942 |
| 2,516,399 | Lovelace | July 25, 1950 |